United States Patent [19]

Wilber et al.

[11] Patent Number: 5,040,769

[45] Date of Patent: Aug. 20, 1991

[54] COLD-WEATHER FUEL NOZZLE ATTACHMENT

[75] Inventors: Gerald F. Wilber, Woodbridge; James D. Lundin, Alexandria; John A. Christians, Springfield, all of Va.

[73] Assignee: The United States of America as represented by the Secretary of the Army, Washington, D.C.

[21] Appl. No.: 407,387

[22] Filed: Sep. 6, 1989

[51] Int. Cl.[5] ........................ F16K 35/10; G05G 5/06

[52] U.S. Cl. ........................ 251/90; 251/232; 251/234; 251/293; 141/392

[58] Field of Search ................ 251/90, 232, 234, 293; 239/525, 526, 530; 141/392

[56] References Cited

U.S. PATENT DOCUMENTS

| | | | |
|---|---|---|---|
| 4,337,917 | 7/1982 | Tesack et al. | 251/90 |
| 4,683,923 | 8/1987 | Harris | 251/90 X |
| 4,846,447 | 7/1989 | Hanna | 251/90 X |

*Primary Examiner*—John Rivell
*Attorney, Agent, or Firm*—Charles Miller; William Randolph; Werten F. W. Bellamy

[57] ABSTRACT

A linkage attachment device is used in cold weather in combination with fuel and water dispensing nozzles having triggers for opening and closing valves for dispensing liquids and for stopping the flow of liquid, without manual contact by the user with such nozzles. Means are provided for preventing the unintended opening of the valves and for limiting the degree to which the valves can be opened by actuating the linkage attachment device.

7 Claims, 3 Drawing Sheets

COLD-WEATHER FUEL NOZZLE ATTACHMENT

GOVERNMENT INTEREST

The invention described herein may be manufactured and used by or for the United States Government for Governmental purposes without the payment of any royalties and is being assigned to the United States Government.

BACKGROUND OF THE INVENTION

1. Field of Invention

This invention relates to attachments for nozzles for dispensing liquid motor fuel or water. It relates particularly to attachments for use in cold weather to such nozzles having valves which are actuated by manually operated triggers.

2. Description of the Prior Art

Nozzles for dispensing liquids such as liquid motor fuels (e. g. gasoline, aviation gasoline, jet fuel and diesel fuel) or water, generally have valves with spring-loaded valve discs which are opened by pushing a valve stem against spring tension to lift a valve disc from the valve seat. The valve stem generally is pushed by a trigger, which is pulled by the user and which returns into its inactive position when released by the action of the spring, which forces the valve disc onto the valve seat, closing the valve and shutting off the flow of liquid.

Nozzles for dispensing liquids as described are generally connected to liquid supply systems via hoses. Such liquid supply systems supply the liquids under moderate pressure to assure a flow of liquid when the valve is opened.

Certain prior art patents have been granted for linkage and lever combinations as attachments to rifles to activate their triggers in cold weather by soldiers wearing hand mittens. However, these are not analogous to the attachment to fuel or water nozzles for cold-weather use as disclosed in the present invention.

BRIEF SUMMARY OF THE INVENTION

This invention relates to an actuating linkage and lever attachment to nozzles for dispensing liquid motor fuel or water allowing the opening and closing of the valves on such nozzles without manual contact by the user. This attachment is particularly useful when gasoline or aviation fuel is pumped in cold weather, in which the user's fingers and hands can be dangerously chilled by the refrigeration effect of cold fuel passing through the fuel nozzle as he holds the nozzle and depresses the trigger for dispensing fuel. Heavy gloves or mittens to protect the user's hands against excessive cold usually interfere with the proper operation of the fuel nozzle.

The present invention provides means for operating liquid dispensing nozzles without direct manual contact via mechanical linkages actuated by handles which can be operated by a user wearing heavy gloves or mittens. It further provides means for blocking the handle in a position in which the valve cannot be activated. Optionally, it may provide means for limiting the extent to which the handle can be moved and the valve opened, thus limiting flow of liquid.

DESCRIPTION OF PREFERRED EMBODIMENTS OF THE INVENTION

Figure 1:
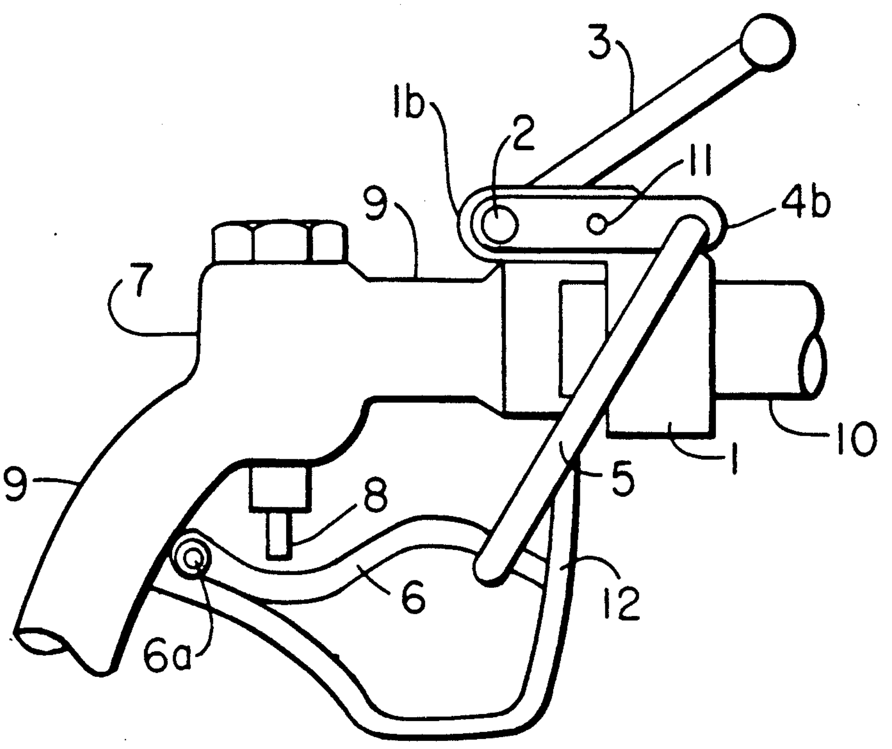
FIG. 1 is a side view of a first embodiment of this invention.

With reference to FIG. 1, the support bracket 1 for the nozzle attachment of this invention is firmly attached to the body of the nozzle 9. The manner of attachment is conventional and depends upon the geometry of the nozzle. In the case shown in FIG. 1, the trigger guard 12 interferes with the direct mounting of the support bracket 1 on the nozzle 9. A cylindrical extension bushing 10 about 3" in length is therefore screwed into the nozzle and the support bracket 1 is secured to this bushing 10 by slipping the support bracket 1, which has a cylindrical bore whose inside diameter is slightly greater than the outside diameter of the bushing, over the bushing and by securing the support bracket 1 by tightening one or several set screws 15 in the body of the support against the outside surface of the bushing. The bushing 10 preferably is a commercially available item such as a CPW 25 hose swivel manufactured by the Dover Corporation of Cincinnati, OH. The bushing 10 in turn is connected to the supply hose via a conventional quick-coupling hose connection (not shown).

Figure 1A:
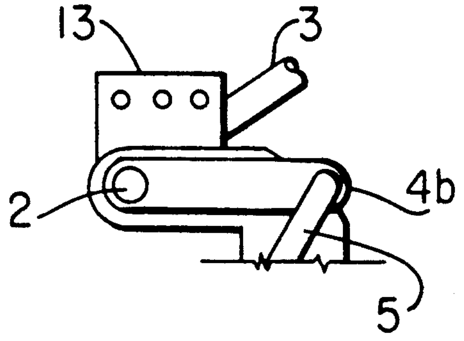
FIG. 1*a* is a view of an optional detail showing means for limiting or blocking the movement of the mechanism of this invention.
Figure 1B:
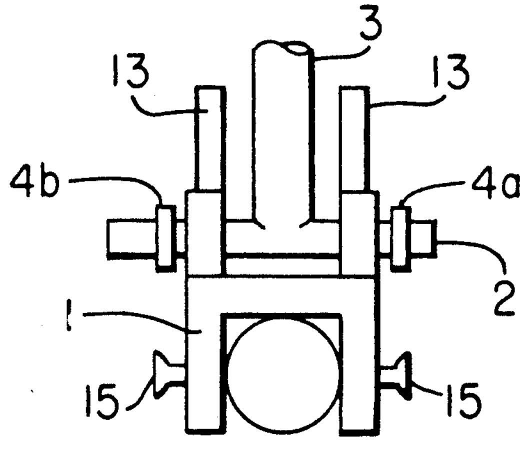
FIG. 1*b* is an end view which shows alternate method of securing the attachment of this invention to a fluid dispensing nozzle.
Figure 1C:
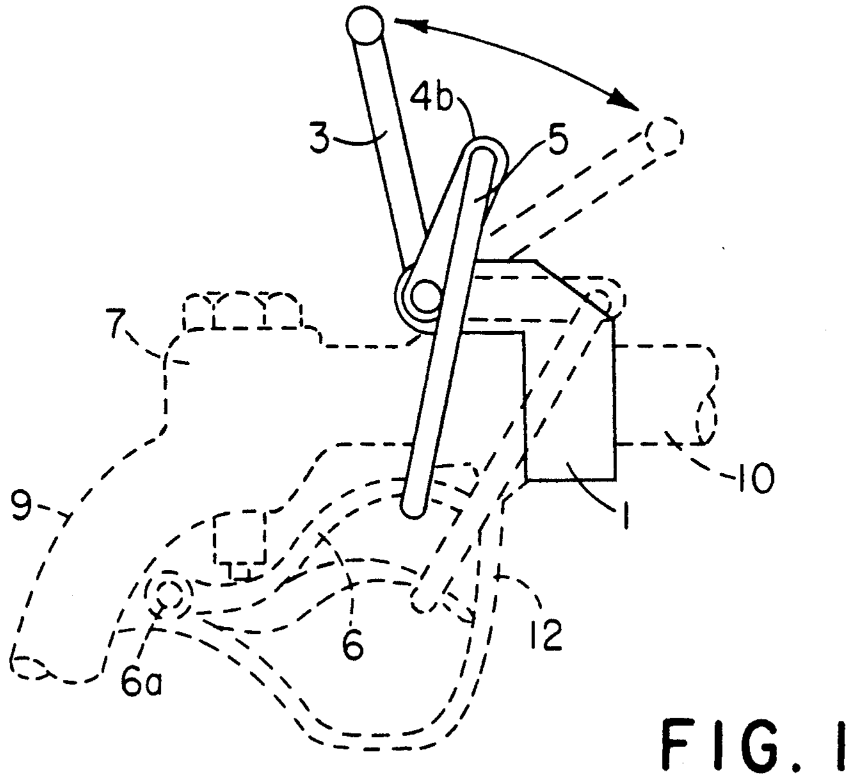
FIG. 1*c* is a side view of the first embodiment of this invention illustrating the open and closed positions of the actuating linkage and lever.

An alternate method of securing the support bracket 1 directly on the nozzle 9 without the need of an extension bushing, shown in FIG. 1*b*, provides a support bracket 1 with a channel which slips over the body of the nozzle and fastens thereto by means of suitable set screws 15 which are tightened against the surface of the nozzle.

Figure 2:
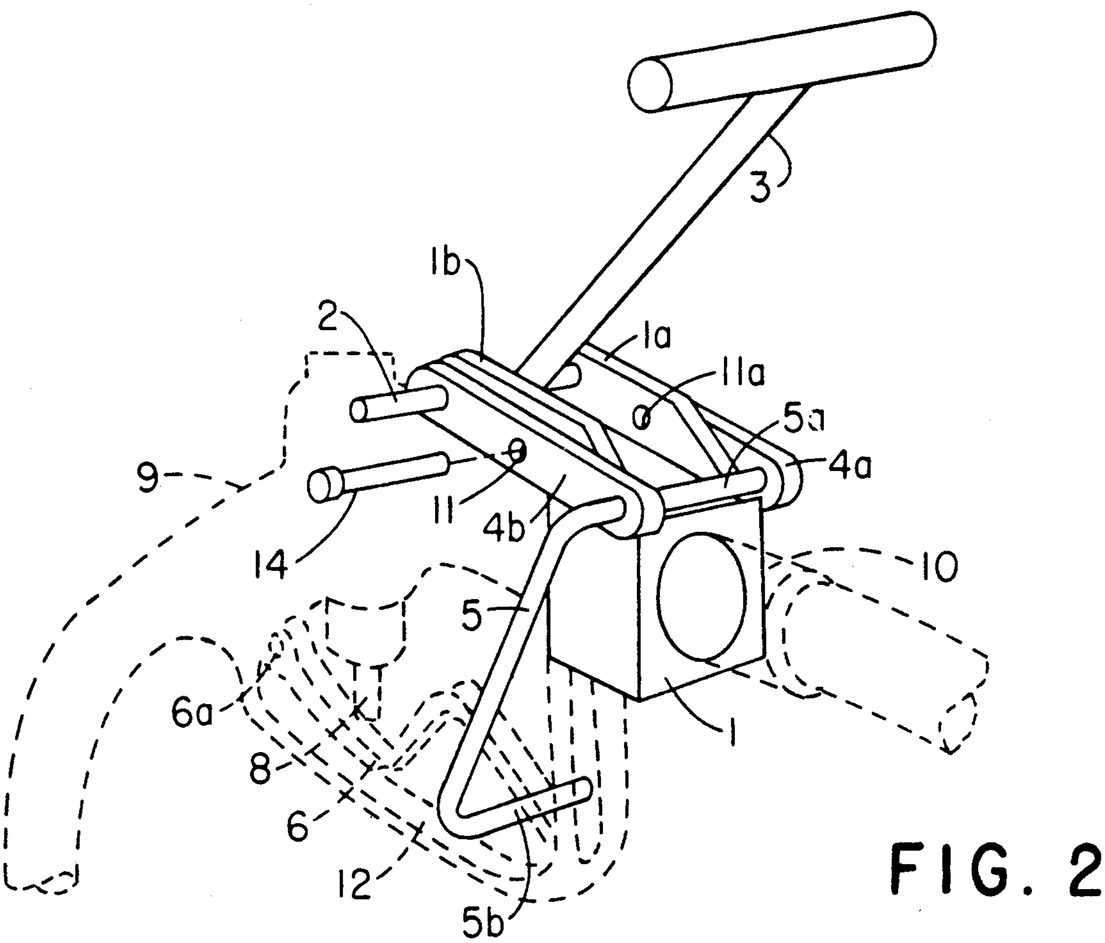
FIG. 2 is a perspective view of the first embodiment of this invention depicted in FIG. 1.

Two forwardly projecting extension arms 1*a* and 1*b* on the support bracket 1, best seen in FIG. 2, are respectively provided with cylindrical holes near their extremities which provide bearings for a pivot pin 2, which rotates in the holes. Either a T-shaped or bail-type of handle 3, shown in FIGS. 1 and 2, is firmly attached to the pin 2, e.g. by welding. Two lever arms 4*a* and 4*b* have their respective forward ends also firmly attached to the outer end portions of the pin 2 by welding. These lever arms also have cylindrical bearing holes near their respective opposite extremities which provide bearings for a portion of a trigger-actuating lever 5 in the shape of a hook or an elongated rectangular C. One arm 5*a* of lever 5 extends through the bearing holes in the lever arms 4*a* and 4*b*, and the lower arm 5*b* of the lever 5 hooks under the trigger 6.

When the handle 3 is rotated in a counterclockwise direction as seen in FIG. 1, the pivot pin 2 rotates counterclockwise, causing the attached lever arms 4*a* and 4*b* to rotate about the pivot pin 2. This action raises the ends of the lever arms 4*a* and 4*b* to which the arm 5*a* of the trigger actuating lever 5 is connected. The lever 5 is thereby raised and, through the engagement of the arm 5*b* at the lower extremity of the lever 5 with the trigger 6, the trigger is raised.

The trigger 6, which is hinged at 6*a*, pushes the valve stem 8 upward into the valve 7, thereby opening the valve and allowing liquid to flow from the liquid supply system and hose (not shown) through the extension bushing 10 and the nozzle 9.

When the handle 3 is released, the spring inside the valve 7 (not shown) closes the valve, shutting off the flow of liquid, and pushes the valve stem 8 downward, causing the trigger to be pushed downward. This in turn causes the bracket 5, lever arms 4*a* and 4*b*, pin 3 and handle 3 to return to their original positions.

To guard against unintended opening of the valve, openings 11 in the respective lever arms 4*a* and 4*b*, as well as matching openings 11*a* in the extension members 1*a* and 1*b* (FIG. 2), are provided through which a removable pin 14 may be passed (FIG. 2), thereby locking the lever arms in place and preventing the valve from being opened by manipulation of the handle 3.

FIG. 1*a* shows a detail for preferably a pair of laterally spaced additional extension members 13 having a plurality of aligned openings through which a removable pin similar to pin 14 may be inserted (pin not shown), thereby either locking the handle in its inactive position, or allowing limited travel of the handle in a counterclockwise direction as seen in FIGS. 1 and 1*a*. The limit on the travel of the handle limits the extent to which the valve can be opened and may be used to limit the liquid flow rate during the dispensing of liquid via the nozzle. The pin or pins 14 are preferably captively attached by a small chain or wire, not shown, to avoid loss thereof.

A further safeguard against excessive opening of the valve is provided by arranging the dimension of the assembly such that the mid-portion of the trigger-actuating lever 5 abuts the end of the pin 2 when the valve is opened to the maximum degree desired, thereby blocking further movement of the lever 5 and limiting the extent to which the valve may be opened.

Figure 3A:
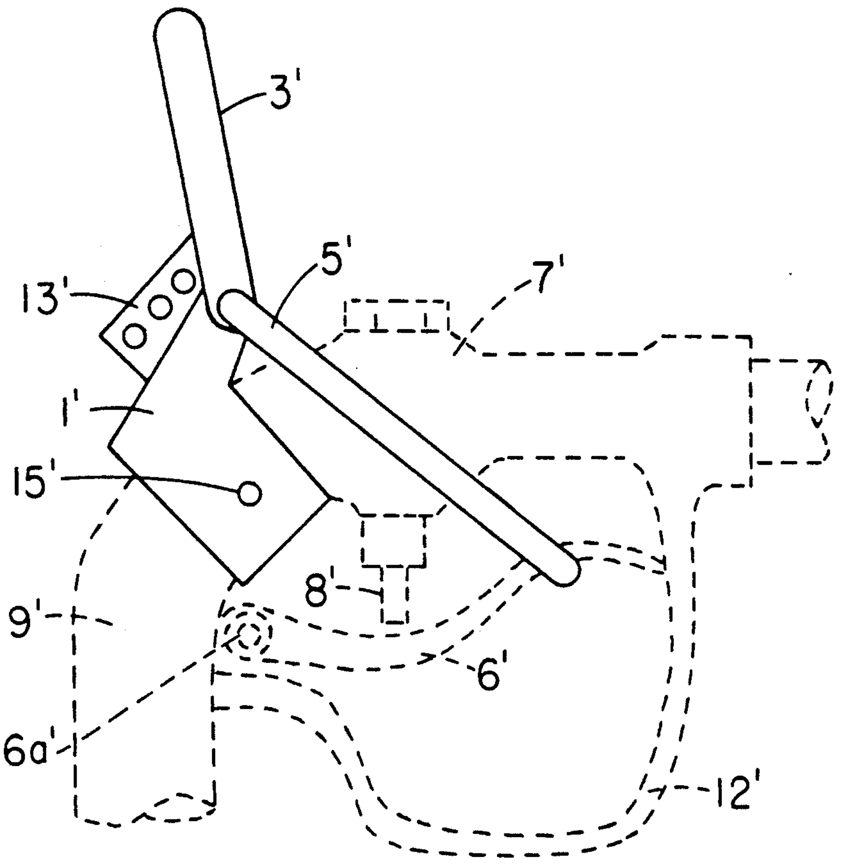
FIG. 3*a* is a side view of an alternate embodiment of this invention.
Figure 3B:
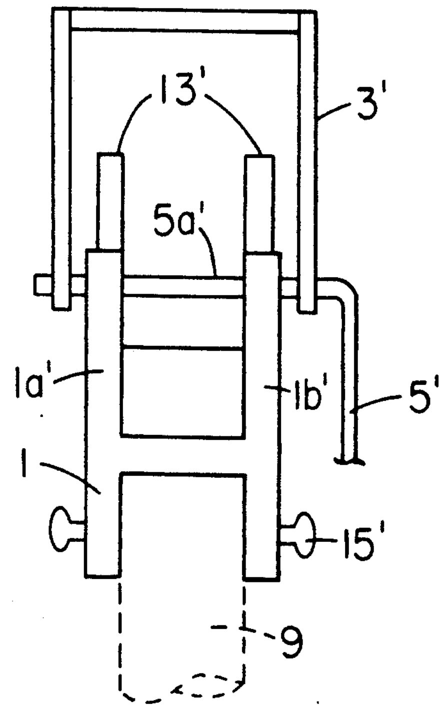
FIG. 3*b* is is an end view of this alternate embodiment of the invention showing a method of attaching the invention to a fluid dispensing nozzle.

An alternative embodiment and attachment position of this invention is illustrated in FIGS. 3*a* and 3*b*, in which primed reference characters are used for designating parts corresponding to those of the previous embodiment. The support bracket 1' is clamped onto the body of the nozzle 9', set screws 15'' being used to secure the support bracket 1' firmly to the nozzle. The upper arm 5*a'* of trigger actuating lever 5' passes through the holes in the extension members 1*a'* and 1*b'*, and a bail type of handle 3' is attached to upper arm 5*a'*, both lever 5' and handle being free to rotate. The trigger actuating lever 5' being connected to said handle 3', both rotate together. As in the previous embodiment, the lever's lower arm 5*b'* engages the trigger 6'. When the handle 3' rotates in a counterclockwise direction as seen in FIG. 3*a*, the lever 5' pulls the trigger 6' upward. The sequence of events causing the valve to open is the same as for the previous embodiment of this invention discussed above. The closing of the valve when the handle is released causes the mechanism to return to its original position.

In both embodiments of the invention, if the extension arms on the support bracket are made wide enough to provide stable bearing for the pivot pin or the upper arm of the trigger actuating lever, then only one such extension arm, instead of two as previously discussed, may be used.

While there have been described what at present are considered to be the preferred embodiments of this invention, it will be obvious to those skilled in the art that various changes and modifications may be made therein without departing from the invention and it is therefore intended to cover all such modifications and changes as fall within the spirit and scope of this invention.

What is claimed is:

1. An actuating linkage attachment device used in combination with liquid dispensing nozzle means having a valve and a trigger for opening and closing the valve, for dispensing liquid and for stopping the flow of liquid, the nozzle means being connected via a hose to a liquid supply system providing liquid under pressure, said attachment device comprising a support bracket including means for rigidly connecting the support bracket to the nozzle means the support bracket having at least one generally horizontal extension arm with its major plane disposed upright, the extension arm having a transverse hole near its extremity to accommodate generally horizontal first pivot pin means;

an actuating handle rigidly connected to the first pivot pin means and being disposed for rotating movement about the axis of the pivot pin, the handle being disposed at an angle between 30 and 120 degrees relative to the extension arm;

a nozzle trigger actuating lever having parallel upper and lower arms interconnected by a transverse portion, the upper arm constituting a second pivot pin means and being operatively connected with both the extension member of the support bracket and with the actuating handle;

whereby the lower arm of the nozzle trigger actuating lever, which engages the nozzle trigger, is adapted to raise the trigger in response to rotation of the actuating handle about the first pivot pin means.

2. The actuating linkage attachment device of claim 1 wherein said support bracket has at least two generally horizontal extension arms forming a spaced-apart pair of forwardly projecting extension arms provided with aligned holes near the forward extremities thereof, said first pivot pin means being disposed rotatably within the aligned holes of said extension arms, the device further including a spaced-apart parallel pair of lever arms each of which has a first end portion connected to opposite end portions of the first pivot pin means, and each of the lever arms further having opposite extremities provided with horizontally aligned holes through which the trigger lever upper arm is pivotally supported, the lower arm of the trigger actuating lever engaging beneath the trigger, whereby the trigger is pulled and released to respectively open and close the valve in response to pivoting motion of the handle and associated trigger actuating linkage.

3. The device of claim 2 wherein each of the forwardly projecting extension arms is provided with an upward projection each having a plurality of horizontally aligned holes, and a removable pin for selective insertion in said horizontally oriented hole to block forward movement of the actuating handle and thereby to prevent the opening of the nozzle.

4. The device of claim 2 wherein the pair of lever arms are provided with horizontally aligned apertures at their approximate mid-positions and disposed closely rearward of the actuating handle when in its normally closed position, and a removable pin removably disposed through the aligned apertures, to prevent inadvertent operation of the actuating lever and opening of the valve.

5. The device of claim 1 wherein the nozzle means includes a cylindrical extension bushing rigidly interposed between the nozzle and a proximal end of the supply hose, and wherein the support bracket includes a bifurcated main body portion with clamping means for rigidly clamping the attachment device onto the extension bushing.

6. An actuating linkage attachment device used in combination with a liquid dispensing nozzle means having a valve and a trigger for opening and closing the valve, for dispensing liquid and for stopping the flow of liquid, the nozzle means being connected via a supply hose to a liquid supply system providing liquid under pressure, the attachment device comprising a support bracket with means for rigidly connecting it to the nozzle mean the support bracket having at least one forwardly projecting extension arm with a transverse cylindrical hole near a forward extremity;

a pivot pin passing through the hole, being free to rotate therein about a horizontal axis of the transverse hole an actuating handle rigidly connected to the pivot pin to activate the device;

at least one lever arm rigidly connected at one extremity to the pivot pin and having a cylindrical hole near its opposite extremity, the lever arm beind disposed at an angle not exceeding 90 degrees to the actuating handle;

a trigger actuating lever having two generally parallel extremities in the form of an upper arm and a lower arm connected by an intermediate portion, the upper arm closely fitting within the cylindrical hole of the lever arm's opposite extremity, and the lever's lower arm engaging beneath the trigger;

whereby the trigger may pulled and released to respectively open and close the valve by pivoting motion of the actuating handle.

7. An actuating linkage in accordance with claim 6 further comprising a second extension member having a second cylindrical hole near its extremity, the first and second holes being in concentric alignment with each other, with the pivot pin passing through the first and second hole.

* * * * *